United States Patent
He

(10) Patent No.: US 11,304,120 B2
(45) Date of Patent: Apr. 12, 2022

(54) METHOD FOR ACQUIRING SYSTEM INFORMATION, USER EQUIPMENT AND NETWORK SIDE DEVICE

(71) Applicant: CHINA ACADEMY OF TELECOMMUNICATIONS TECHNOLOGY, Beijing (CN)

(72) Inventor: Yuan He, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 465 days.

(21) Appl. No.: 16/334,641

(22) PCT Filed: Aug. 16, 2017

(86) PCT No.: PCT/CN2017/097674
§ 371 (c)(1),
(2) Date: Mar. 19, 2019

(87) PCT Pub. No.: WO2018/059153
PCT Pub. Date: Apr. 5, 2018

(65) Prior Publication Data
US 2021/0289423 A1 Sep. 16, 2021

(30) Foreign Application Priority Data
Sep. 30, 2016 (CN) .......................... 201610874443.2

(51) Int. Cl.
*H04W 48/10* (2009.01)
*H04W 48/16* (2009.01)

(52) U.S. Cl.
CPC ........... *H04W 48/10* (2013.01); *H04W 48/16* (2013.01)

(58) Field of Classification Search
CPC .............................. H04W 48/10; H04W 48/20
See application file for complete search history.

(56) References Cited

U.S. PATENT DOCUMENTS

| 2014/0287750 A1* | 9/2014 | Fox ....................... H04W 48/12 |
| | | 455/434 |
| 2015/0257173 A1 | 9/2015 | You et al. |

(Continued)

FOREIGN PATENT DOCUMENTS

| CN | 101730173 A | 6/2010 |
| CN | 102111855 A | 6/2011 |
| CN | 102300186 A | 12/2011 |

(Continued)

OTHER PUBLICATIONS

Samsung, "Report of Email Discussion on [94#40] [NR] System Information", 3GPP 1-48 TSG-RAN WG 295, R2-165201, Aug. 26, 2016 (Aug. 26, 2016), pp. 12-21.

(Continued)

*Primary Examiner* — Qutbuddin Ghulamali
(74) *Attorney, Agent, or Firm* — Ladas & Parry, LLP

(57) ABSTRACT

A method for acquiring a system information SI, a user equipment UE and a network side device. The method includes: receiving, by the UE, an SI table index from the network side device; and acquiring, by the UE, the SI based on the SI table index and a pre-acquired SI table. The SI table includes SI table indices, SI and a parameter configuration of the SI.

18 Claims, 5 Drawing Sheets

```
receiving, by a UE, an SI table index from a network side    /201
device
                              │
                              ▼
acquiring, by the UE, the SI in accordance with based on    /202
the SI table index and a pre-acquired SI table
```

(56) References Cited

U.S. PATENT DOCUMENTS

2016/0219470 A1 7/2016 Jheng et al.
2018/0049107 A1* 2/2018 Johansson ............. H04W 48/10

FOREIGN PATENT DOCUMENTS

| JP | 2016507962 A | 3/2016 |
|---|---|---|
| WO | 2016119710 A1 | 8/2016 |

OTHER PUBLICATIONS

International Search Report for PCT/CN2017/097674 dated Oct. 27, 2017 and its English translation provided by WIPO.
Written Opinion of the International Searching Authority for PCT/CN2017/097674 dated Oct. 27, 2017 and its English translation provided by Google Translate.
Extended European Search Report from EP app. No. 17854605.7, dated May 24, 2019.
"NR System Information Aspects", R2-165588, 3GPP TSG-RAN WG2 Meeting #95, Goteborg, Sweden, Aug. 22-26, 2016.
"Index based provisioning of system information in NR", R2-165550, 3GPP TSG-RAN WG2 Meeting #95, Goteborg, Sweden, Aug. 22-26, 2016.
"System information for standalone NR deployment", R2-163586, 3GPP TSG-RAN WG2 Meeting #94, Nanjing, China, May 23-27, 2016.
"System information for standalone NR deployment", R2-165007, 3GPP TSG-RAN WG2 Meeting #95, Goteborg, Sweden, Aug. 22-26, 2016.
"System Information Signalling Design in NR", R2-164693, 3GPP TSG-RAN WG2 Meeting #95, Goteborg, Sweden, Aug. 22-26, 2016.
"System Information delivery in NR", R2-165111, 3GPP TSG-RAN WG2 Meeting #95, Goteborg, Sweden, Aug. 22-26, 2016.
International Preliminary Report on Patentability from PCT/CN2017/097674, dated Apr. 2, 2019, with English translation provided by WIPO.
Written Opinion of the International Searching Authority from PCT/CN2017/097674, dated Oct. 27, 2017, with English translation provided by WIPO.
Notice of Reasons for Refusal from JP app. No. 2019-516946, dated Mar. 3, 2020, with English translation from Global Dossier.
"System Information Area", R2-164809, 3GPP TSG RAN WG2 Meeting #95, Gothenburg, Sweden, Aug. 22-26, 2016.

* cited by examiner transmitting, by a network side device, an SI table index to a UE, so as to enable the UE to acquire the SI in accordance with based on the SI table index and a pre-acquired SI table — 301
Fig. 3
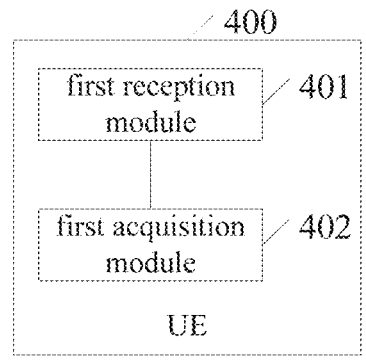
Fig. 4
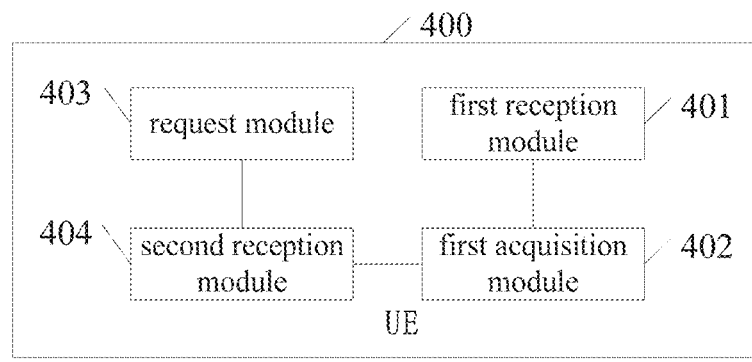
Fig. 5

METHOD FOR ACQUIRING SYSTEM INFORMATION, USER EQUIPMENT AND NETWORK SIDE DEVICE

CROSS-REFERENCE TO RELATED APPLICATIONS

The present application is the U.S. national phase application of a PCT Application No. PCT/CN2017/097674 filed on Aug. 16, 2017, which claims a priority to Chinese patent application No. 201610874443.2 filed on Sep. 30, 2016, the disclosures of which are incorporated herein by reference in their entireties.

TECHNICAL FIELD

The present disclosure relates to the field of communication technology, in particular to a method for acquiring system information (SI), a user equipment (UE), and a network side device.

BACKGROUND

For a wireless communication system, SI mainly includes a master information block (MIB) and a plurality of system information blocks (SIBs). Each SIB may include such system information as SIB1 to SIB20. In actual use, the SI needs to be broadcast in many scenarios. For example, when a UE accesses to a new cell or a broadcast message changes, the SI may be broadcast. Currently, all the SI, i.e., the MIB, the SIB1 and the SI (which includes SIB2 to SIB20, and which may probably be extended to include more information), needs to be broadcast each time. In the wireless communication system, the SI is broadcast periodically, and along with the diversification of services and the continuous evolution of terminal types, the SI may include more and more contents, so an overhead for the SI may become larger and larger. In other words, there is an excessive overhead for the SI in the wireless communication system.

SUMMARY

An object of the present disclosure is to provide a method for acquiring. SI, a UE and a network side device, so as to reduce the overhead for the SI in the wireless communication system.

In one aspect, the present disclosure provides in some embodiments a method for acquiring SI, including: receiving, by a UE, SI table index from a network side device; and acquiring, by the UE, the SI based on the SI table index and a pre-acquired SI table. The SI table includes SI table indices, SI and a parameter configuration of the SI.

In a possible embodiment of the present disclosure, the SI table includes an SI table received by the UE and periodically broadcast by the network side device, or an SI table pre-configured or pre-stored in the UE, or an SI table acquired by the UE through downloading.

In a possible embodiment of the present disclosure, the SI table includes SI periodically broadcast by the network side device and/or on-demand SI.

In a possible embodiment of the present disclosure, the method further includes: transmitting, by the UE, an SI table request to the network side device via an SI table request resource, the SI table request resource being a resource acquired by the UE from the SI periodically broadcast by the network side device and receiving, by the UE, the SI table transmitted by the network side device based on the SI table request.

In a possible embodiment of the present disclosure, the SI table includes on-demand SI from the network side device.

In a possible embodiment of the present disclosure, the SI table includes a valid area. The valid area includes one or more SI areas having a same SI table, or the valid area includes one or more cells having a same SI table, or the valid area includes one or more network side devices having a same SI table.

In a possible embodiment of the present disclosure, there is an implicit mapping relationship between the SI table and the valid area, or the SI table further includes description information about the valid area of the SI table.

In a possible embodiment of the present disclosure, the description information includes one or more of a SI area identifier list, a cell identifier list and a network side device identifier list, or the description information includes an SI table identifier for identifying the valid area of the SI table.

In a possible embodiment of the present disclosure, the receiving, by the UE, the SI table index from the network side device includes receiving, by the UE, the SI table index periodically broadcast or transmitted on demand by the network side device. The acquiring, by the UE, the SI based on the SI table index and the pre-acquired SI table includes: determining, by the UE, whether the SI table includes the received SI table index, if yes, determining that the SI table is valid, and otherwise determining that the SI table is invalid; and when the SI table is valid, looking up, by the UE, the SI corresponding to the received SI table index in the SI table.

In a possible embodiment of the present disclosure, the method further includes: detecting, by the UE, an identifier corresponding to the network side device, the identifier including a SI area identifier, a cell identifier or a network side device identifier; and determining, by the UE, whether the network side device is located in the valid area of the SI table based on the detected identifier, if yes, determining that the SI table is valid, and otherwise, determining that the SI table is invalid. The receiving, by the UE, the SI table index from the network side device includes, when the SI table is valid, receiving, by the UE, the SI table index periodically broadcast or transmitted on demand by the network side device. The acquiring, by the UE, the SI based on the SI table index and the pre-acquired SI table includes looking up, by the UE, the SI corresponding to the received SI table index in the SI table.

In a possible embodiment of the present disclosure, the receiving, by the UE, the SI table index from the network side device includes receiving, by the UE, the SI table index and an SI table identifier periodically broadcast or transmitted on demand by the network side device. The acquiring, by the UE, the SI based on the SI table index and the pre-acquired SI table includes: determining, by the UE, whether the received SI table identifier is the same as an SI table identifier in the SI table, if yes, determining that the SI table is valid, and otherwise, determining that the SI table is invalid; and when the SI table is valid, looking up, by the UE, the SI corresponding to the received. SI table index in the SI table.

In a possible embodiment of the present disclosure, the SI table index is a one-level SI table index pointing to a group of SI and a parameter configuration of the group of SI, and the group of SI includes one or more pieces of SI, or the SI table index is a two-level SI table index with a first-level index pointing to the SI and a second-level index pointing to a parameter configuration of the SI to which the first-level index points.

In a possible embodiment of the present disclosure, the method further includes, when the UE determines that the SI table is invalid, acquiring, by the UE, a new SI table.

In another aspect, the present disclosure provides in some embodiments a method for acquiring SI, including transmitting, by a network side device, an SI table index to a UE, so as to enable the UE to acquire the SI based on the SI table index and a pre-acquired SI table. The SI table includes SI table indices, SI and a parameter configuration of the SI.

In a possible embodiment of the present disclosure, the SI table includes an SI table received by the UE and periodically broadcast by the network side device, or an SI table pre-configured or pre-stored in the UE, or an SI table acquired by the UE through downloading.

In a possible embodiment of the present disclosure, the SI table includes SI periodically broadcast by the network side device and/or on-demand SI.

In a possible embodiment of the present disclosure, the method further includes: receiving, by the network side device, an SI table request transmitted by the UE via an SI table request resource, the SI table request resource being a resource acquired by the UE from the SI periodically broadcast by the network side device; and transmitting, by the network side device, the SI table to the UE based on the SI table request.

In a possible embodiment of the present disclosure, the SI table includes on-demand SI from the network side device.

In a possible embodiment of the present disclosure, the SI table includes a valid area. The valid area includes one or more SI areas having a same SI table, or the valid area includes one or more cells having a same SI table, or the valid area includes one or more network side devices having a same SI table.

In a possible embodiment of the present disclosure, there is an implicit mapping relationship between the SI table and the valid area, or the SI table further includes description information about the valid area of the SI table.

In a possible embodiment of the present disclosure, the description information includes one or more of a SI area identifier list, a cell identifier list and a network side device identifier list, or the description information includes an SI table identifier for identifying the valid area of the SI table.

In a possible embodiment of the present disclosure, the transmitting, by the network side device, the SI table index to the UE includes periodically broadcasting or transmitting on demand, by the network side device, the SI table index to the UE, or periodically broadcasting or transmitting on demand, by the network side device, the SI table index and an SI table identifier to the UE.

In a possible embodiment of the present disclosure, the SI table index is a one-level SI table index pointing to a group of SI and a parameter configuration of the group of SI, and the group of SI includes one or more pieces of SI, or the SI table index is a two-level SI table index with a first-level index pointing to the SI and a second-level index pointing to a parameter configuration of the SI to which the first-level index points.

In yet another aspect, the present disclosure provides in some embodiments a UE, including: a first reception module configured to receive an SI table index from a network side device; and a first acquisition module configured to acquire the SI based on the SI table index and a pre-acquired SI table. The SI table includes SI table indices, SI and a parameter configuration of the SI.

In a possible embodiment of the present disclosure, the SI table includes an SI table received by the UE and periodically broadcast by the network side device, or an SI table pre-configured or pre-stored in the UE, or an SI table acquired by the UE through downloading.

In a possible embodiment of the present disclosure, the SI table includes SI periodically broadcast by the network side device and/or on-demand SI.

In a possible embodiment of the present disclosure, the UE further includes: a request module configured to transmit an SI table request to the network side device via an SI table request resource, the SI table request resource being a resource acquired by the UE from the SI periodically broadcast by the network side device; and a second reception module configured to receive the SI table transmitted by the network side device based on the SI table request.

In a possible embodiment of the present disclosure, the SI table includes on-demand SI from the network side device.

In a possible embodiment of the present disclosure, the SI table includes a valid area. The valid area includes one or more SI areas having a same SI table, or the valid area includes one or more cells having a same SI table, or the valid area includes one or more network side devices having a same SI table.

In a possible embodiment of the present disclosure, there is an implicit mapping relationship between the SI table and the valid area, or the SI table further includes description information about the valid area of the SI table.

In a possible embodiment of the present disclosure, the description information includes one or more of a SI area identifier list, a cell identifier list and a network side device identifier list, or the description information includes an SI table identifier for identifying the valid area of the SI table.

In a possible embodiment of the present disclosure, the first reception module is further configured to receive the SI table index periodically broadcast or transmitted on demand by the network side device. The first acquisition module includes: a first determination unit configured to determine whether the SI table includes the received SI table index, if yes, determine that the SI table is valid, and otherwise determine that the SI table is invalid; and a first lookup unit configured to, when the SI table is valid, look up the SI corresponding to the received SI table index in the SI table.

In a possible embodiment of the present disclosure, the LIE further includes: a detection module configured to detect an identifier corresponding to the network side device, the identifier including a SI area identifier, a cell identifier or a network side device identifier; and a determination module configured to determine whether the network side device is located in the valid area of the SI table based on the detected identifier, if yes, determine that the SI table is valid, and otherwise, determine that the SI table is invalid. The first reception module is further configured to, when the SI table is valid, receive the SI table index periodically broadcast or transmitted on demand by the network side device. The first acquisition module is further configured to look up the SI corresponding to the received SI table index in the SI table.

In a possible embodiment of the present disclosure, the first reception module is further configured to receive the SI table index and an SI table identifier periodically broadcast or transmitted on demand by the network side device. The first acquisition module includes: a second determination unit configured to determine whether the received SI table identifier is the same as an SI table identifier in the SI table, if yes, determine that the SI table is valid, and otherwise, determine that the SI table is invalid; and a second lookup unit configured to, when the SI table is valid, look up the SI corresponding to the received SI table index in the SI table.

In a possible embodiment of the present disclosure, the SI table index is a one-level SI table index pointing to a group of SI and a parameter configuration of the group of SI, and the group of SI includes one or more pieces of SI, or the SI table index is a two-level SI table index with a first-level index pointing to the SI and a second-level index pointing to a parameter configuration of the SI to which the first-level index points.

In a possible embodiment of the present disclosure, the UE further includes a second acquisition module configured to, when the SI table is invalid, acquire a new SI table.

In still yet another aspect, the present disclosure provides in some embodiments a network side device, including a first transmission nodule configured to transmit an SI table index to a UE, so as to enable the UE to acquire the SI based on the SI table index and a pre-acquired SI table. The SI table includes SI table indices, SI and a parameter configuration of the SI.

In a possible embodiment of the present disclosure, the SI table includes an SI table received by the UE and periodically broadcast by the network side device, or an SI table pre-configured or pre-stored in the UE, or an SI table acquired by the UE through downloading.

In a possible embodiment of the present disclosure, the SI table includes SI periodically broadcast by the network side device and/or on-demand SI.

In a possible embodiment of the present disclosure, the network side device further includes: a reception module configured to receive an SI table request transmitted by the UE via an SI table request resource, the SI table request resource being a resource acquired by the UE from the SI periodically broadcast by the network side device; and a second transmission module configured to transmit the SI table to the UE based on the SI table request.

In a possible embodiment of the present disclosure, the SI table includes on-demand SI from the network side device.

In a possible embodiment of the present disclosure, the SI table includes a valid area. The valid area includes one or more SI areas having a same SI table, or the valid area includes one or more cells having a same SI table, or the valid area includes one or more network side devices having a same SI table.

In a possible embodiment of the present disclosure, there is an implicit mapping relationship between the SI table and the valid area, or the SI table further includes description information about the valid area of the SI table.

In a possible embodiment of the present disclosure, the description information includes one or more of a SI area identifier list, a cell identifier list and a network side device identifier list, or the description information includes an SI table identifier for identifying the valid area of the SI table.

In a possible embodiment of the present disclosure, the first transmission module is further configured to periodically broadcast or transmit on demand the SI table index to the UE, or periodically broadcast or transmit on demand the SI table index and an SI table identifier to the UE.

In a possible embodiment of the present disclosure, the SI table index is a one-level SI table index pointing to a group of SI and a parameter configuration of the group of SI, and the group of SI includes one or more pieces of SI, or the SI table index is a two-level SI table index with a first-level index pointing to the SI and a second-level index pointing to a parameter configuration of the SI to which the first-level index points.

In still yet another aspect, the present disclosure provides in some embodiments a UE, including a processor, a transceiver and a memory. The processor is configured to read a program stored in the memory, so as to: receive through the transceiver an SI table index from a network side device; and acquire the SI based on the SI table index and a pre-acquired SI table. The SI table includes SI table indices, SI and a parameter configuration of the SI. The transceiver is configured to receive and transmit data under the control of the processor.

In still yet another aspect, the present disclosure provides in some embodiments a network side device, including a processor, a transceiver and a memory. The processor is configured to read a program stored in the memory, so as to transmit through the transceiver an SI table index to a UE, so as to enable the UE to acquire the SI based on the SI table index and a pre-acquired SI table. The SI table includes SI table indices, SI and a parameter configuration of the SI. The transceiver is configured to receive and transmit data under the control of the processor.

According to the embodiments of the present disclosure, the UE receives the SI table index from the network side device, and acquires the SI based on the SI table index and the pre-acquired SI table. The SI table includes the SI table index, the SI and the parameter configuration of the SI. As a result, it is able for the UE to acquire the SI merely through transmitting the SI table index to the UE. As compared with the related art where all the SI needs to be broadcast periodically, it is able to reduce the overhead for the SI.

BRIEF DESCRIPTION OF THE DRAWINGS

FIG. 3 is a flow chart of another method for acquiring SI according to one embodiment of the present disclosure;

FIG. 4 is a schematic view showing a UE according to one embodiment of the present disclosure;

FIG. 5 is another schematic view showing the UE according to one embodiment of the present disclosure;

DETAILED DESCRIPTION OF THE EMBODIMENTS

In order to make the objects, the technical solutions and the advantages of the present disclosure more apparent, the present disclosure will be described hereinafter in a clear and complete manner in conjunction with the drawings and embodiments.

Figure 1:
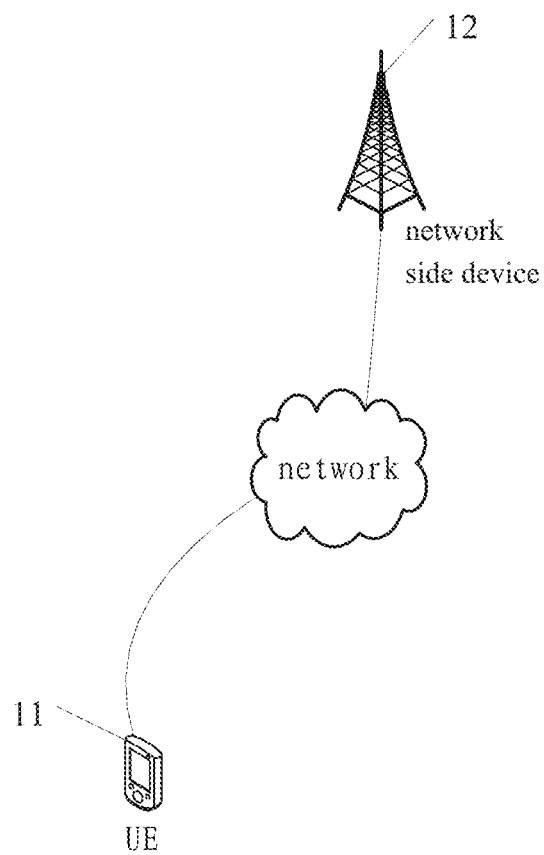
FIG. 1 is a schematic view showing a network according to one embodiment of the present disclosure.

As shown in FIG. 1 which is a schematic view showing a network according to one embodiment of the present disclosure, the network includes one or more UEs 11 and a network side device 12. In FIG. 1, one UE 11 is taken as an example. The UE 11 may be a mobile phone, a tablet personal computer, a laptop computer, a personal digital assistant (PDA), a mobile Internet device (MID) or a wearable device. It should be appreciated that, a type of the UE 11 will not be particularly defined in the embodiments of the present disclosure. The UE 11 may communicate with the network side device 12. Through the network in FIG. 1, the UE 11 may be in wireless communication with the network side device 12. The network side device 12 may be a base station, e.g., a macro base station a Long Term Evolution evolved Node B (LTE eNB) or a $5^{th}$-Generation New Radio NB (5G NR NB)), a micro base station a low power node (LPN) pica or femto eNB), or an access point (AP). The network side device 12 may also be a network node consisting of a central unit (CU) and a plurality of Transmission Reception Points (TRPS) managed and controlled by the CU. In addition, one or more cells (e.g., different frequency points or sector fissions) may be managed by one base station. It should be further appreciated that, a type of the network side device 12 will not be particularly defined in the embodiments of the present disclosure.

Figure 2:
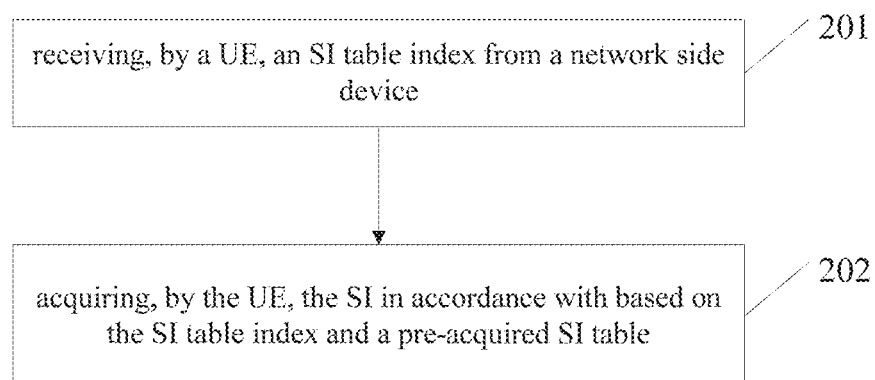
FIG. 2 is a flow chart of a method for acquiring SI according to one embodiment of the present disclosure.

As shown in FIG. 2, the present disclosure provides in some embodiments a method for acquiring SI, which includes: Step 201 of receiving, by a UE, an SI table index from a network side device; and Step 202 of acquiring, by the UE, the SI based on the SI table index and a pre-acquired SI table. The SI table includes SI table indices, SI and a parameter configuration of the SI.

In the embodiments of the present disclosure, the SI table index may include indices for one or more pieces of SI. e.g., one or more of an NUB and SIB1 to SIB20. In addition, the SI table index may include indices for one or more groups of pieces of SI. The SI table index may point to the SI, and all or parts of parameter configurations of the SI to which the SI table index points. It should be appreciated that, the parameter configuration included in the SI table may be a parameter configuration of the SI included in the SI table. The SI may not be limited to the MIB and the SIB1 to SIB20, and instead, it may also include SIBn (n is an integer greater than 20) or extended SI which is adapted to a future wireless communication system. In addition, the SI table index may also include indices for all or parts of SI in the on-demand SI from the network side device. The on-demand SI may include parts of the SI included in the network side device, or the SI other than the SI periodically broadcast by the network side device. In a possible embodiment of the present disclosure, the SI table index may further include indices for all or parts of the SI periodically broadcast by the network side device. The SI periodically broadcast may be the SI which is included in the network side device and which needs to be broadcast periodically, e.g., the SI other than the on-demand SI or the SI for enabling the UE to reside in the cell and access to the resident cell, all or parts of the contents in the MIB, the SIB1 and the SIB2, or necessary SI for enabling the UE to reside in the cell and access to the resident cell. In addition, the on-demand SI may also be understood as the SI to be transmitted in an on-demand manner.

Because the SI table includes the SI table index, the SI and the parameter configuration of the SI, when the UE has received the SI table index and the SI table index received in Step 201 belongs to the indices in the SI table, the corresponding SI and the corresponding parameter configuration may be acquired in Step 202. Of course, when the SI table index received in Step 201 does not belong to the indices in the SI table, the SI in the SI table may not be acquired in Step 202, and instead, a new SI table may be acquired.

It should be appreciated that, the pre-acquired SI table may be understood as the SI table acquired prior to Step 202, or the SI table adopted prior to Step 201.

According to the embodiments of the present disclosure, it is able to transmit the SI table index between the UE and the network side device through the above-mentioned steps, thereby to enable the UE to acquire the SI. As a result, it is able to reduce the resource overhead for the entire SI, improve the resource utilization of the system, and improve the efficiency and practicability as compared with the related art.

In a possible embodiment of the present disclosure, the SI table includes an SI table received by the UE and periodically broadcast by the network side device, or an SI table pre-configured or pre-stored in the UE, or an SI table acquired by the UE through downloading.

In the embodiments of the present disclosure, the SI table may be an SI table received by the UE and periodically broadcast by the network side device, i.e., the network side device may periodically transmit the SI table through broadcasting. In addition, because the SI table includes a large amount of contents, a broadcasting period of the SI table may be relatively long, e.g., at a scale of hundreds of milliseconds or several seconds. In addition, the SI table may also be an SI table pre-configured or pre-stored in the UE. For example, the SI table and the default parameter configuration have been defined in the $3^{rd}$-Generation Partnership Project (3GPP) protocol, and during the manufacture of the UE, the SI table has already been pre-configured or pre-stored in the UE. Further, the SI table may include all or parts of SI and parameter configurations defined in the protocol. Through pre-configuration or pre-storage, it is unnecessary for the UE to occupy any network transmission resources, so as to save the network resources. Of course, even when the SI table has been pre-configured or pre-stored in the UE, it may also be updated at a regular interval.

In addition, in the embodiments of the present disclosure, the UE may also acquire the SI table through downloading. The UE may download the SI table through a non-3GPP access network, e.g., through an Uniform Resource Locator (URL). Of course, in some scenarios, the SI table may also be downloaded through a 3GPP access network, which will not be particularly defined herein.

In a possible embodiment of the present disclosure, the SI table includes SI periodically broadcast by the network side device and/or on-demand SI.

In this way, the UE may acquire the SI periodically broadcast by the network side device, or the SI periodically broadcast by the network side device and the on-demand SI, or the on-demand SI from the network side device, via the SI table index. For example, the SI table may include all the SI from the network side device, all the SI periodically broadcast by the network side device, or all the on-demand SI. Of course, the SI table may also include parts of the above-mentioned SI.

In a possible embodiment of the present disclosure, the method further includes: transmitting, by the UE, an SI table request to the network side device via an SI table request resource, the SI table request resource being a resource acquired by the UE from the SI periodically broadcast by the network side device; and receiving, by the UE, the SI table transmitted by the network side device based on the SI table request.

The SI table request resource may be a resource indicated in the SI periodically broadcast by the network side device, or a resource determined by the UE based on the SI periodically broadcast by the network side device. During the implementation, the UE may receive the SI table from the network side device in a requesting/responding manner, so that the SI table is sent in an on-demand manner, thereby to reduce the network resource overhead.

In a possible embodiment of the present disclosure, the SI table may include on-demand SI from the network side device. For example, the SI table may include all or parts of the on-demand SI from the network side device.

In a possible embodiment of the present disclosure, the SI table may include a valid area. The valid area may include one or more SI areas (SIAs) having a same SI table, or the valid area may include one or more cells having a same SI table, or the valid area may include one or more network side devices having a same SI table.

During the implementation, the SI table is merely valid in the valid area. In this way, the SI table may merely include the SI in the valid area, so as to prevent the SI table from including too much SI, thereby to prevent the waste of the storage resources for the UE and the network transmission resources.

In the embodiments of the present disclosure, the SIAs may be areas where the SI is completely or mostly the same. For example, the SIAs may include one or more cells, and the SI in each cell of the SIAs may be completely or mostly the same. In addition, the SIAs may include one or more network side devices, and the SI for each network side device in the SIAs may be completely or mostly the same.

In addition, each cell may be a cell belonging to a 5G NR NB, or a cell belonging to one or more TRPs managed and controlled by the CU. Each cell may be identified through a frequency point plus a Physical Cell Identifier (PCI), and the UE may search for the cell and the PCI at a corresponding frequency point. When the SIAs merely include one cell, the SIAs are equivalent to the cell. The network side device may be an LTE eNB, a 5G NR NB, an AP, a CU or a TRP.

During the implementation, one SI table may be applied to one or more SIAs, one or more cells or one or more network side devices, so as to further reduce the network transmission resource overhead. This is because, when the UE moves among the SIAs, cells or network side devices, it is unnecessary to acquire a new SI table.

In a possible embodiment of the present disclosure, there is an implicit mapping relationship between the SI table and the valid area, or the SI table further includes description information about the valid area of the SI table.

During the implementation, the valid area of the SI table may be determined in an implicit or explicit manner. Based on the implicit mapping relationship, the valid area of the SI table may be configured or determined by default when the UE has acquired the SI table. For example, when the UE is delivered from the factory, the valid area of the SI table may be configured as a certain operator. Of course, the valid area may be configured as a certain operator or a certain SIA when the UE has acquired the SI table subsequently. In addition, the implicit mapping relationship may also be a mapping relationship between the SI to which one or more groups of SI table indices point as well as the parameter configuration thereof and the valid areas. For example, a Public Land Mobile Network (PLMN) of the operator may correspond to the default SI and parameter configuration, and the default SI and parameter configuration may include the SI to which one or more SI table indices point and the parameter configuration thereof. Through the above-mentioned implicit mapping relationship, it is merely necessary for the UE to acquire the SI table index rather than the other information, so as to acquire the SI, thereby to reduce the network transmission resource overhead.

The description information about the valid area may be information about the valid area of the SI table indicated or described by a user, and this information may be a list or an identifier, which will not be particularly defined herein. When it is necessary for the UE to acquire the SI, the UE may determine whether the SI table is valid in an area or cell where the UE is currently located based on the implicit mapping relationship or the description information about the valid area. When the SI table is valid, the UE may acquire the SI from the SI table, and when the SI table is invalid, the UE may acquire a new SI table.

In a possible embodiment of the present disclosure, the description information may include one or more of a SIA identifier list, a cell identifier list and a network side device identifier list, or the description information may include an SI table identifier (ID) for identifying the valid area of the SI table.

During the implementation, the SI table may include the above-mentioned lists, so as to facilitate the determination of the valid area of the SI table. In addition, the description information may be understood as a network node list. For example, an SIA ID list, a cell ID list or a TRP ID list may serve as the network node list in the valid area of the SI table.

In addition, the valid area of the SI table may be determined based on the SI table ID. For example, one or more SIAs/cells/TRPs in the valid area of the SI table may have a same SI table ID, and these SIAs/cells/TRPs may be configured to transmit the same SI table ID, so as to determine that the SI table is valid for the SIAs/cells/TRPs.

In a possible embodiment of the present disclosure, the receiving, by the UE, the SI table index from the network side device may include receiving, by the UE, the SI table index periodically broadcast or transmitted on demand by the network side device. The acquiring, by the UE, the SI based on the SI table index and the pre-acquired SI table may include: determining, by the UE, whether the SI table includes the received SI table index, if yes, determining that the SI table is valid, and otherwise determining that the SI table is invalid; and when the SI table is valid, looking up, by the UE, the SI corresponding to the received SI table index in the SI table.

During the implementation, the SI table index may be periodically broadcast by the network side device, or transmitted on demand. For example, the network side device may receive an on-demand SI request message from the UE, so that the network side device may transmit or broadcast an on-demand SI response message to the UE. The response message may include the SI table index. In addition, the on-demand SI request message may be transmitted when the UE determines that the SI table index is not to be transmitted within a predetermined period. For example, based on the SI broadcast by the network side device, the UE may determine that the SI table index is not to be transmitted by the network side device within a next period, so the UE may acquire the SI table index in an on-demand manner. Further, during the implementation, when the SI table includes the received SI table index, i.e., when the SI table index transmitted by the network side device to the UE may be included in an index list of the SI table. The SI table may be determined as valid, so the UE may acquire the corresponding SI. When the SI table is invalid, the IE may acquire a new SI table, and receive a new SI table index. The new SI table may be acquired with reference to Step 202, and thus will not be particularly defined herein.

In addition, during the implementation, for the SI periodically broadcast, the SI table index may be periodically broadcast, and for the on-demand SI, the SI table index may be periodically broadcast or transmitted on demand. Of course, the SI table index for the SI periodically broadcast may also be transmitted on demand. In some scenarios, the network side device may be a network side device in one or more SIAs or cells, or it may include one or more network side devices. In other words, the UE may acquire the SI table index from one or more network side devices, and then acquire the corresponding SI as mentioned hereinabove.

During the implementation, merely the SI table index is transmitted between the UE and the network side device, so it is able to further reduce the network transmission resource overhead.

In a possible embodiment of the present disclosure, the method may further include: detecting, by the UE, an identifier corresponding to the network side device, the identifier including a SI area identifier, a cell identifier or a network side device identifier; and determining, by the UE, whether the network side device is located in the valid area of the SI table based on the detected identifier, if yes, determining that the SI table is valid, and otherwise, determining that the SI table is invalid. The receiving, by the UE, the SI table index from the network side device may include, when the SI table is valid, receiving, by the UE, the SI table index periodically broadcast or transmitted on demand by the network side device. The acquiring, by the UE, the SI based on the SI table index and the pre-acquired SI table may include looking up, by the UE, the SI corresponding to the received SI table index in the SI table.

The identifier corresponding to the network side device may be detected by the UE via a physical layer, and the identifier may be an identifier of the SIA where the network side device is located, or an identifier of the cell where the network side device is located. The network side device may be a network side device in one or more SIAs or cells, or it may include one or more network side devices. For example, the UE may find one or more SIAs, cells or TRPs via the physical layer, acquire the corresponding SIA IDs, cell IDs or TRP IDs, and compare them with those in a stored SIA ID/cell ID/TRP ID list. When they are included in the list, the UE may determine that the stored SI table is valid, and otherwise determine that the stored SI table is invalid. When the SI table is valid, the UE may receive the SI table from the one or more SIAs/cells/TRPs, and search for a corresponding SIB in the stored SI table. When the SI table is invalid, the UE may acquire a new SI table as mentioned hereinabove, and transmit and receive a new SI table index. It should be appreciated that, when the SI table is valid with respect to parts of the SIAs, cells or network side devices, the UE may acquire the SI corresponding to the SI table index from these SIAs, cells or network side devices, and then acquire a new SI table so as to acquire the SI corresponding to the SI from the other SIAs, cells or network side devices.

During the implementation, the SI table index is acquired from the network side device after the SI table has been determined as valid, so it is able to prevent the acquisition of the SI table index from the network side device when the SI table is invalid, thereby to further reduce the network transmission resource overhead. This is because, when the SI table is invalid, it makes no sense for the UE to acquire the SI table index from the network side device.

In a possible embodiment of the present disclosure, the receiving, by the UE, the SI table index from the network side device includes receiving, by the UE, the SI table index and an SI table identifier periodically broadcast or transmitted on demand by the network side device. The acquiring, by the UE, the SI based on the SI table index and the pre-acquired SI table includes: determining, by the UE, whether the received SI table identifier is the same as an SI table identifier in the SI table, if yes, determining that the SI table is valid, and otherwise, determining that the SI table is invalid; and when the SI table is valid, looking up, by the UE, the SI corresponding to the received SI table index in the SI table.

During the implementation, the network side device may transmit the SI table index and the SI table identifier to the UE, e.g., transmit the SI table index and the SI table identifier via a same message or simultaneously. Similarly, the network side device may be a network side device in one or more SIAs or cells, or it may include one or more network side devices. In this way, the UE may acquire the SI table ID from one or more SIAs/cells/network side devices, and compare it with the stored SI table ID. When the acquired SI table ID is the same as the stored SI table ID, the UE may determine that content of the stored SI table is valid, and otherwise determine that the content of the stored SI table is invalid. When the content of the SI table is valid, the UE may receive the SI table index from the one or more SIAs/cells/network side devices, and search for a corresponding SIB in the stored SI table. When the content of the SI table is invalid, the UE may acquire a new SI table as mentioned hereinabove, and receive a new SI table index.

In a possible embodiment of the present disclosure, the SI table index may be a one-level SI table index pointing to a group of SI and a parameter configuration of the group of SI, and the group of SI may include one or more pieces of SI, or the SI table index may be a two-level SI table index with a first-level index pointing to the SI and a second-level index pointing to a parameter configuration of the SI to which the first-level index points.

During the implementation, the SI table index may point to a group of SI and a parameter configuration thereof. For example, index 1 may correspond to SIB1 to SIB5 and parameter configurations 1 of SIB1 to SIB5, index2 may correspond to SIB1 to SIB5 and parameter configurations 1 of SIB1 to SIB5, index3 may correspond to SIB1 to SIB5 and parameter configurations 2 of SIB1 to SIB5, and index4 may correspond to SIB1 to SIB5 and parameter configurations 2 of SIB1 to SIB5. In addition, a two-level index may also be provided, i.e., a first-level index of the SI table index may point to one piece of SI, and the second-level index may point to a parameter configuration of the SI. For example, index (1,2) may correspond to a parameter configuration 2 of SIB1, and index (2,1) may correspond to a parameter configuration 1 of SIB2.

In a possible embodiment of the present disclosure, the method further includes, when the SI table is invalid, acquiring, by the UE, a new SI table.

The SI table may be determined as invalid based on the SI table index, the identifier corresponding to the network side device or the SI table identifier as mentioned above. Of course, any other way may also be applied so as to determine the SI table as invalid, which will not be particularly defined herein.

It should be appreciated that, the above-mentioned possible embodiments may be combined with each other or implemented individually, which will not be particularly defined herein.

According to the embodiments of the present disclosure, the UE receives the SI table index from the network side device, and acquires the SI based on the SI table index and the pre-acquired SI table. The SI table includes the SI table index, the SI and the parameter configuration of the SI. As a result, it is able for the UE to acquire the SI merely through transmitting the SI table index to the UE. As compared with the related art where all the SI needs to be broadcast periodically, it is able to reduce the overhead for the SI.

As shown in FIG. 3, the present disclosure further provides in some embodiments a method for acquiring SI, which includes Step 301 of transmitting, by a network side device, an SI table index to a UE, so as to enable the UE to acquire the SI based on the SI table index and a pre-acquired SI table. The SI table includes SI table indices, SI and a parameter configuration of the SI.

In a possible embodiment of the present disclosure, the SI table may include an SI table received by the UE and periodically broadcast by the network side device, or an SI table pre-configured or pre-stored in the UE, or an SI table acquired by the UE through downloading.

In a possible embodiment of the present disclosure, the SI table includes SI periodically broadcast by the network side device and/or on-demand SI.

In a possible embodiment of the present disclosure, the method may further include: receiving, by the network side device, an SI table request transmitted by the UE via an SI table request resource, the SI table request resource being a resource acquired by the UE from the SI periodically broadcast by the network side device; and transmitting, by the network side device, the SI table to the UE based on the SI table request.

In a possible embodiment of the present disclosure, the SI table may include on-demand SI from the network side device.

In a possible embodiment of the present disclosure, the SI table may include a valid area. The valid area may include one or more SI areas having a same SI table, or the valid area may include one or more cells having a same SI table, or the valid area may include one or more network side devices having a same SI table.

In a possible embodiment of the present disclosure, there is an implicit mapping relationship between the SI table and the valid area, or the SI table may further include description information about the valid area of the SI table.

In a possible embodiment of the present disclosure, the description information may include one or more of a SI area identifier list, a cell identifier list and a network side device identifier list, or the description information may include an SI table identifier for identifying the valid area of the SI table.

In a possible embodiment of the present disclosure, the transmitting, by the network side device, the SI table index to the UE may include periodically broadcasting or transmitting on demand, by the network side device, the SI table index to the UE, or periodically broadcasting or transmitting on demand, by the network side device, the SI table index and an SI table identifier to the UE.

In a possible embodiment of the present disclosure, the SI table index may be a one-level SI table index pointing to a group of SI and a parameter configuration of the group of SI, and the group of SI may include one or more pieces of SI, or the SI table index may be a two-level SI table index with a first-level index pointing to the SI and a second-level index pointing to a parameter configuration of the SI to which the first-level index points.

It should be appreciated that, the implementation of the method at the network side device may refer to the implementation of the method in FIG. 2, which will not be particularly defined herein for avoiding repetition. According to the method in the embodiments of the present disclosure, it is also able to reduce the overhead for the SI.

Detailed description will be given as follows through several examples.

Example 1

In this example, a transmission and reception procedure of the SI table index will be described when the SI table is broadcast periodically by the network side device. The method includes the following steps.

Step 1: a UE1 may receive the SI table periodically broadcast by the network side device, and the SI table may include the on-demand SI and the SI periodically broadcast. The SI table periodically broadcast by the network side device includes a large amount of contents, so a broadcasting period may be relatively long, e.g., 500 ms or 1 s.

The SI table may include an SI table index and an SIA ID list. The SI table index may be a one-level index pointing to a group of SI and a parameter configuration thereof. For example, index1 may correspond to SIB1 to SIB5. The valid area of the SI table may include two SIAs, i.e., the SIA ID list may be {SIA ID1, SIA ID2}.

Step 2: the network side device may periodically broadcast the SI table index in SIA1 and SIA2 included in the valid area of the SI table. A broadcasting period of the SI table index may be shorter than the broadcasting period of the SI table, e.g., 100 ms or 200 ms.

Step 3: the UE1 may detect and find SIA1 via the physical layer, acquire the corresponding SI ID1, and compare it with the stored SIA ID list. The SIA ID1 is included in the list, so the content of the stored SI table may be determined as valid. When the content of the SI table is valid, the UE1 may receive the SI table index from the SIA1, and search for a corresponding SIB in the stored SI table.

Example 2

In this example, a transmission and reception procedure of the SI table index will be described when the SI table is pre-configured in the UE. The method includes the following steps.

Step 1: an SI table and a default parameter configuration has been defined in the 3GPP protocol, so when a UE2 customized by China Mobile has delivered from the factory, the SI table has been pre-configured/pre-stored in the UE2, and the SI table may include the SI periodically broadcast by the network side device.

The SI table may include a plurality of groups of SI table indices pointing to default SI and default parameter configurations corresponding to the PLMN of China Mobile. Each SI table index may be a two-level index. For example, index (1,2) may correspond to a parameter configuration 2 of SIB1, and index (2,1) may correspond to a parameter configuration 1 of SIB2.

Step 2: a plurality of cells included in the valid area of the SI able, i.e., a plurality of cells (e.g., cell 1 to cell 10) in the PLMN of China Mobile, may periodically broadcast the SI table index.

Step 3: the UE2 may acquire the SI table index, e.g., index (1,2) or index (2,2), from cell 1, and compare it with the stored SI table indices. Index (1,2) from cell 1 is included in the stored SI table indices, so the content of the stored SI table may be determined as valid. When the content of the SI table is valid, the UE2 may search for a corresponding SIB in the stored in SI table based on the SI table index. In addition, index (2,2) from cell 1 is not included in the stored SI table indices, so the content of the stored SI table may be determined as invalid. When the content of the SI table is invalid, the UE2 may acquire a new SI table in a requesting/responding manner, and the new SI table may include the parameter configuration 2 of SIB2 corresponding to index (2,2).

Example 3

In this example, a transmission and reception procedure of the SI table index will be described when the SI table is acquired by the UE through requesting/responding. The method includes the following steps.

Step 1: a UE3 may acquire an SI table request resource from the SI periodically broadcast by the network side device, and then acquire the SI table from the network side device in a requesting/responding manner. The SI table may include the on-demand SI.

The SI table may include an SI table index and an SI table ID. The SI table index may be a one-level index pointing to a group of pieces of SI and parameter configurations thereof. For example, index2 may correspond to SIB1 to SIB8. The SI table ID may be configured to identify the valid area of the SI table. For example, a TRP1 and a TRP2 included in the valid area of the SI table may have a same SI table ID1, i.e., the TRP1 and TRP2 may transmit the same SI table ID1.

Step 2: the TRP1 and TRP2 included in the valid area of the SI table may transmit on demand the SI table indices and the SI table IDs.

Step 3: the UE3 may acquire the SI table index and the SI table ID, e.g., index2 and SI table ID1, from the TRP1 in a requesting/responding manner, and compare the SI table 1D1 with the stored SI table ID. The SI table ID1 is the same as the stored SI table ID, so the content of the stored SI table may be determined as valid. When the content of the SI table is valid, the UE3 may search for a corresponding SIB in the stored SI table based on index2.

As shown in FIG. 4, the present disclosure further provides in some embodiments a UE 400 which includes: a first reception module 401 configured to receive an SI table index from a network side device; and a first acquisition module 402 configured to acquire the SI based on the SI table index and a pre-acquired SI table. The SI table includes SI table indices, SI and a parameter configuration of the SI.

In a possible embodiment of the present disclosure, the SI table may include an SI table received by the UE and periodically broadcast by the network side device, or an SI table pre-configured or pre-stored in the UE, or an SI table acquired by the UE through downloading.

In a possible embodiment of the present disclosure, the SI table may include SI periodically broadcast by the network side device and/or on-demand SI.

In a possible embodiment of the present disclosure, as shown in FIG. 5, the UE 400 may further include: a request module 403 configured to transmit an SI table request to the network side device via an SI table request resource, the SI table request resource being a resource acquired by the UE from the SI periodically broadcast by the network side device; and a second reception module 404 configured to receive the SI table transmitted by the network side device based on the SI table request.

In a possible embodiment of the present disclosure, the SI table may include on-demand SI from the network side device.

In a possible embodiment of the present disclosure, the SI table may include a valid area. The valid area may include one or more SI areas having a same SI table, or the valid area may include one or more cells having a same SI table, or the valid area may include one or more network side devices having a same SI table.

In a possible embodiment of the present disclosure, there is an implicit mapping relationship between the SI table and the valid area, or the SI table may further include description information about the valid area of the SI table.

In a possible embodiment of the present disclosure, the description information may include one or more of a SI area identifier list, a cell identifier list and a network side device identifier list, or the description information may include an SI table identifier for identifying the valid area of the SI table.

Figure 6:
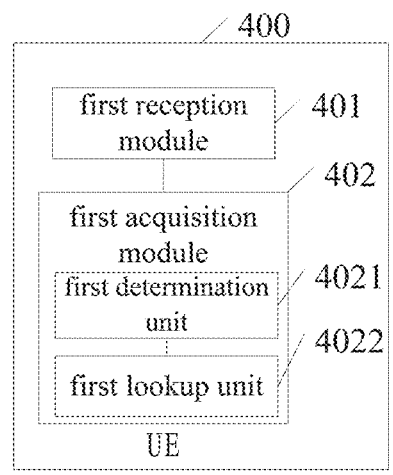
FIG. 6 is yet another schematic view showing the UE according to one embodiment of the present disclosure.

In a possible embodiment of the present disclosure, the first reception module may be further configured to receive the SI table index periodically broadcast or transmitted on demand by the network side device. As shown in FIG. 6, the first acquisition module 402 may include: a first determination 4021 configured to determine whether the SI table includes the received SI table index, if yes, determine that the SI table is valid, and otherwise determine that the SI table is invalid; and a first lookup unit 4022 configured to, when the SI table is valid, look up the SI corresponding to the received SI table index in the SI table.

Figure 7:
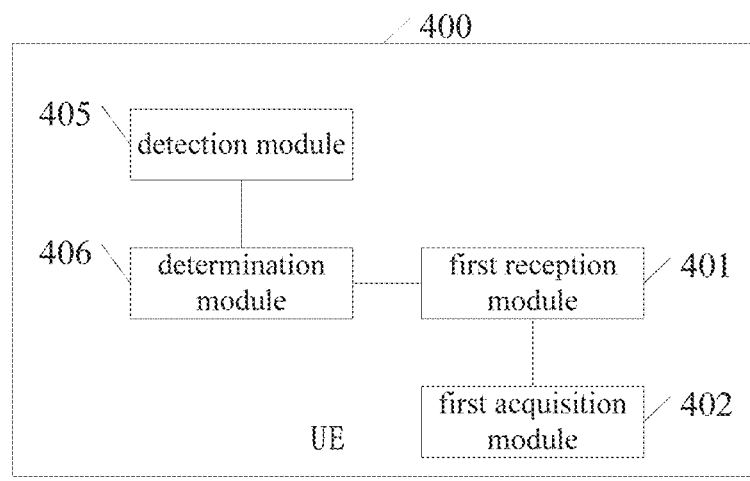
FIG. 7 is still yet another schematic view showing the UE according to one embodiment of the present disclosure.

In a possible embodiment of the present disclosure, as shown in FIG. 7, the UE 400 may further include: a detection module 405 configured to detect an identifier corresponding to the network side device, the identifier including a SI area identifier, a cell identifier or a network side device identifier; and a determination module 406 configured to determine whether the network side device is located in the valid area of the SI table based on the detected identifier, if yes, determine that the SI table is valid, and otherwise, determine that the SI table is invalid. The first reception module 401 may be further configured to, when the SI table is valid, receive the SI table index periodically broadcast or transmitted on demand by the network side device. The first acquisition module 402 may be further configured to look up the SI corresponding to the received SI table index in the SI table.

Figure 8:
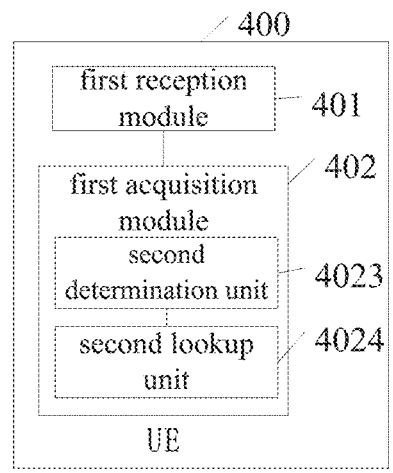
FIG. 8 is still yet another schematic view showing the UE according to one embodiment of the present disclosure.

In a possible embodiment of the present disclosure, the first reception module 401 may be further configured to receive the SI table index and an SI table identifier periodically broadcast or transmitted on demand by the network side device. As shown in FIG. 8, the first acquisition module 402 may include: a second determination unit 4023 configured to determine whether the received SI table identifier is the same as an SI table identifier in the SI table, if yes, determine that the SI table is valid, and otherwise, determine that the SI table is invalid; and a second lookup unit 4024 configured to, when the SI table is valid, look up the SI corresponding to the received SI table index in the SI table.

In a possible embodiment of the present disclosure, the SI table index may be a one-level SI table index pointing to a group of SI and a parameter configuration of the group of SI, and the group of SI may include one or more pieces of SI, or the SI table index may be a two-level SI table index with a first-level index pointing to the SI and a second-level index pointing to a parameter configuration of the SI to which the first-level index points.

Figure 9:
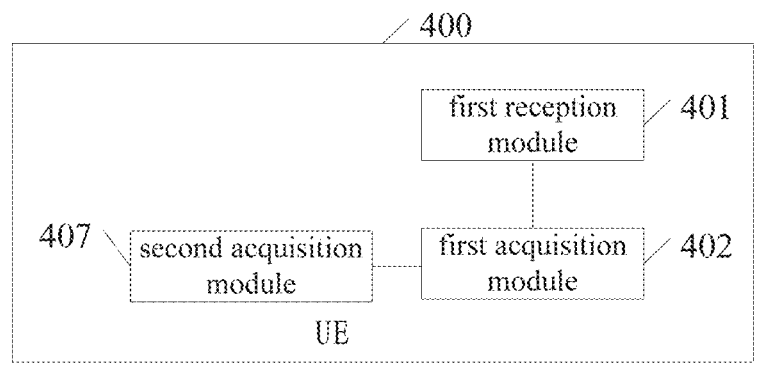
FIG. 9 is still yet another schematic view showing the UE according to one embodiment of the present disclosure.

In a possible embodiment of the present disclosure, as shown in FIG. 9, the UE 400 may further include a second acquisition module 407 configured to, when UE determines that the SI table is invalid, acquire a new SI table.

It should be appreciated that, the implementation of the UE 400 may refer to the implementation of the method at the UE mentioned hereinabove, with a same beneficial effect, Which will not be particularly defined herein.

Figure 10:
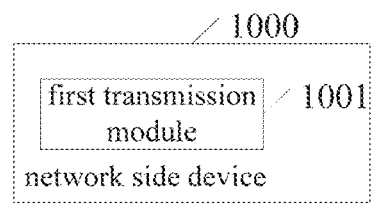
FIG. 10 is a schematic view showing a network side device according to one embodiment of the present disclosure.

As shown in FIG. 10, the present disclosure further provides in some embodiments a network side device 1000 which includes a first transmission module 1001 configured to transmit an SI table index to a UE, so as to enable the UE to acquire the SI based on the SI table index and a pre-acquired SI table. The SI table includes SI table indices, SI and a parameter configuration of the SI.

In a possible embodiment of the present disclosure, the SI table may include an SI table received by the UE and periodically broadcast by the network side device, or an SI table pre-configured or pre-stored in the UE, or an SI table acquired by the UE through downloading.

In a possible embodiment of the present disclosure, the SI table may include SI periodically broadcast by the network side device and/or on-demand SI.

Figure 11:
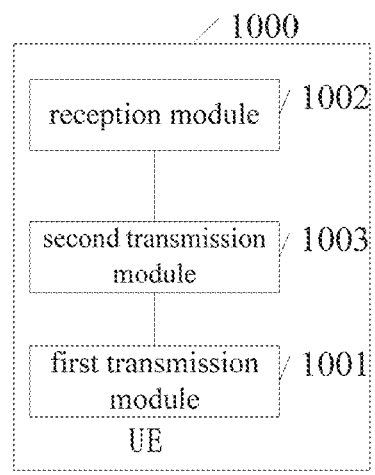
FIG. 11 is another schematic view showing the network side device according to one embodiment of the present disclosure.

In a possible embodiment of the present disclosure, as shown in FIG. 11, the network side device 1000 may further include: a reception module 1002 configured to receive an SI table request transmitted by the UE via an SI table request resource, the SI table request resource being a resource acquired by the UE from the SI periodically broadcast by the network side device; and a second transmission module 1003 configured to transmit the SI table to the UE based on the SI table request.

In a possible embodiment of the present disclosure, the SI table includes on-demand SI from the network side device.

In a possible embodiment of the present disclosure, the SI table may include a valid area. The valid area may include one or more SI areas having a same SI table, or the valid area may include one or more cells having a same SI table, or the valid area may include one or more network side devices having a same SI table.

In a possible embodiment of the present disclosure, there is an implicit mapping relationship between the SI table and the valid area, or the SI table may further include description information about the valid area of the SI table.

In a possible embodiment of the present disclosure, the description information may include one or more of a SI area identifier list, a cell identifier list and a network side device identifier list, or the description information may include an SI table identifier for identifying the valid area of the SI table.

In a possible embodiment of the present disclosure, the first transmission module is further configured to periodically broadcast or transmit on demand the SI table index to the UE, or periodically broadcast or transmit on demand the SI table index and an SI table identifier to the UE.

In a possible embodiment of the present disclosure, the SI table index may be a one-level SI table index pointing to a group of SI and a parameter configuration of the group of SI, and the group of SI may include one or more pieces of SI, or the SI table index may be a two-level SI table index with a first-level index pointing to the SI and a second-level index pointing to a parameter configuration of the SI to which the first-level index points.

It should be appreciated that, the implementation of the network side device 800 may refer to the implementation of the method at the network side device mentioned hereinabove, with a same beneficial effect, which will not be particularly defined herein.

Figure 12:
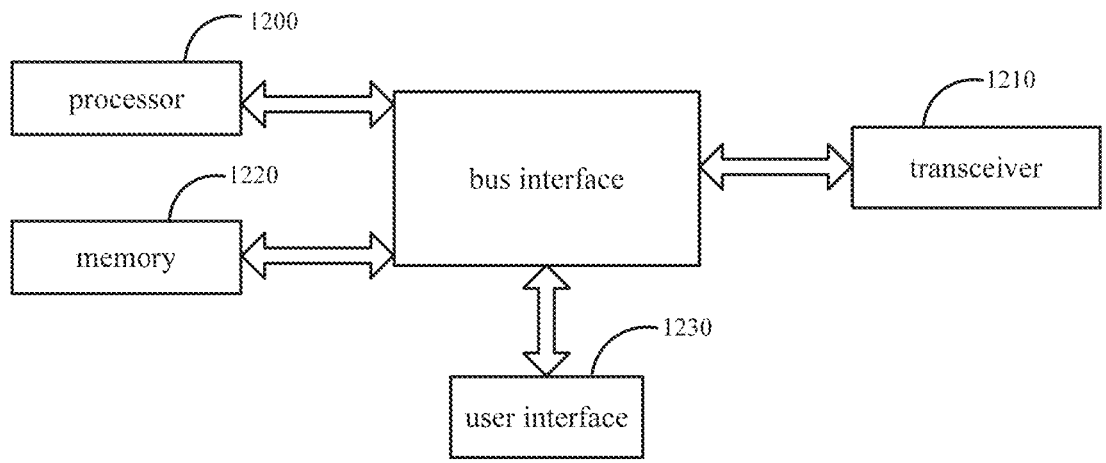
FIG. 12 is still yet another schematic view showing the UE according to one embodiment of the present disclosure.

As shown in FIG. 12, the present disclosure further provides in some embodiments a UE which includes a processor 1200, a transceiver 1210, a, memory 1220, a user interface 1230 and a bus interface. The processor 1200 is configured to read a program stored in the memory 1200, so as to: receive through the transceiver 1210 an SI table index from a network side device; and acquire the SI based on the SI table index and a pre-acquired SI table. The SI table includes SI table indices, SI and a parameter configuration of the SI. The transceiver 1210 is configured to receive and transmit data under the control of the processor 1200.

In FIG. 12, bus architecture may include any quantities of buses and bridges connected to each other, so as to connect various circuits for one or more processors 1200 and one or more memories 1220. In addition, as is known in the art, the bus architecture may be used to connect any other circuits, such as a circuit for a peripheral device, a circuit for a voltage stabilizer and a power management circuit, which are not particularly defined herein. The bus interface may be provided, and the transceiver 1210 may consist of more than one elements, e.g., a transmitter and a receiver for communication with any other devices over a transmission medium. With respect to different UEs, the user interface 1230 may also be provided for devices which are to be arranged inside or outside the UE, and these devices may include but not limited to a keypad, a display, a speaker, a microphone and a joystick. The processor 1200 may take charge of managing the bus architecture as well as general processing. The memory 1220 may store therein data for the operation of the processor 1200.

In a possible embodiment of the present disclosure, the SI table may include an SI table received by the UE and periodically broadcast by the network side device, or an SI table pre-configured or pre-stored in the UE, or an SI table acquired by the UE through downloading.

In a possible embodiment of the present disclosure, the SI table may include SI periodically broadcast by the network side device and/or on-demand SI.

In a possible embodiment of the present disclosure, the processor 1200 is further configured to: transmit through the transceiver 1210 an SI table request to the network side device via an SI table request resource, the SI table request resource being a resource acquired by the UE from the SI periodically broadcast by the network side device; and receive through the transceiver 1210 the SI table transmitted by the network side device based on the SI table request.

In a possible embodiment of the present disclosure, the SI table may include on-demand SI from the network side device.

In a possible embodiment of the present disclosure, the SI table may include a valid area. The valid area may include one or more SI areas having a same SI table, or the valid area may include one or more cells having a same SI table, or the valid area may include one or more network side devices having a same SI table.

In a possible embodiment of the present disclosure, there is an implicit mapping relationship between the SI table and the valid area, or the SI table may further include description information about the valid area of the SI table.

In a possible embodiment of the present disclosure, the description information may include one or more of a SI area identifier list, a cell identifier list and a network side device identifier list, or the description information may include an SI table identifier for identifying the valid area of the SI table.

In a possible embodiment of the present disclosure, the processor 1200 is further configured to: receive through the transceiver 1210 the SI table index periodically broadcast or transmitted on demand by the network side device; determine whether the SI table includes the received SI table index, if yes, determine that the SI table is valid, and otherwise determine that the SI table is invalid; and when the SI table is valid, look up the SI corresponding to the received SI table index in the SI table.

In a possible embodiment of the present disclosure, the processor 1200 is further configured to: detect an identifier corresponding to the network side device, the identifier including a SI area identifier, a cell identifier or a network side device identifier: determine whether the network side device is located in the valid area of the SI table based on the detected identifier, if yes, determine that the SI table is valid, and otherwise, determine that the SI table is invalid; when the SI table is valid, receive through the transceiver 1210 the SI table index periodically broadcast or transmitted on demand by the network side device; and look up the SI corresponding to the received SI table index in the SI table.

In a possible embodiment of the present disclosure, the processor 1200 is further configured to: receive through the transceiver 1210 the SI table index and an SI table identifier periodically broadcast or transmitted on demand by the network side device; determine whether the received SI table identifier is the same as an SI table identifier in the SI table, if yes, determine that the SI table is valid, and otherwise, determine that the SI table is invalid; and when the SI table is valid, look up the SI corresponding to the received SI table index in the SI table.

In a possible embodiment of the present disclosure, the SI table index may be a one-level SI table index pointing to a group of SI and a parameter configuration of the group of SI, and the group of SI may include one or more pieces of SI, or the SI table index may be a two-level SI table index with a first-level index pointing to the SI and a second-level index pointing to a parameter configuration of the SI to which the first-level index points.

In a possible embodiment of the present disclosure, the processor 1200 is further configured to, when UE determines that the SI table is invalid, acquire a new SI table.

It should be appreciated that, the implementation of the UE may refer to the implementation of the method at the UE mentioned hereinabove, with a same beneficial effect, which will not be particularly defined herein.

Figure 13:
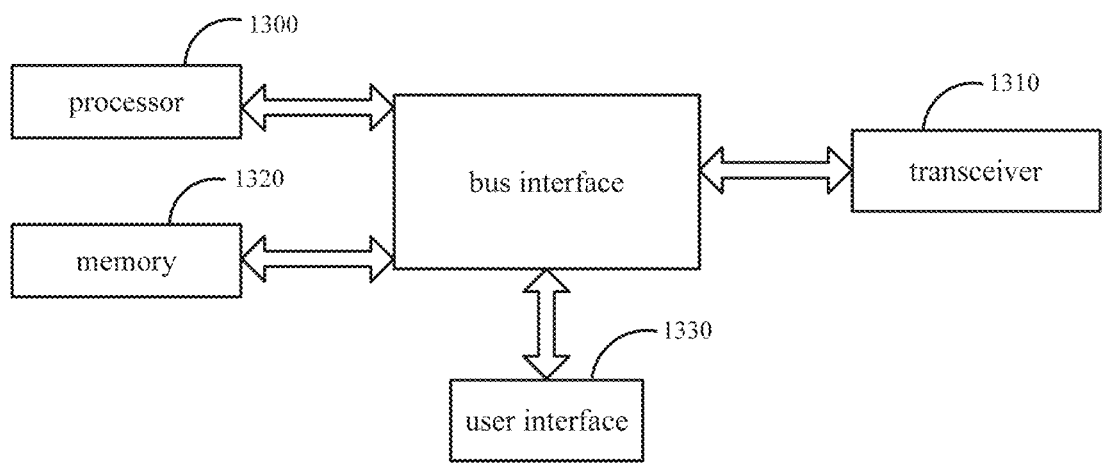
FIG. 13 is yet another schematic view showing the network side device according to one embodiment of the present disclosure.

As shown in FIG. 13, the present disclosure further provides in some embodiments a network side device, including a processor 1300, a transceiver 1310, a memory 1320, a user interface 1330 and a bus interface. The processor 1300 is configured to read a program stored in the memory 1320, so as to transmit Through the transceiver 1310 an SI table index to a UE, so as to enable the UE to acquire the SI based on the SI table index and a pre-acquired SI table. The SI table includes SI table indices, SI and a parameter configuration of the SI. The transceiver 1310 is configured to receive and transmit data under the control of the processor 1300.

In FIG. 13, bus architecture may include any quantities of buses and bridges connected to each other, so as to connect various circuits for one or more processors 1300 and one or more memories 1320. In addition, as is known in the art, the bus architecture may be used to connect any other circuits, such as a circuit for a peripheral device, a circuit for a voltage stabilizer and a power management circuit, which are not particularly defined herein. The bus interface may be provided, and the transceiver 1310 may consist of more than one elements, e.g., a transmitter and a receiver for communication with any other devices over a transmission medium. With respect to different UEs, the user interface 2130 may also be provided for devices which are to be arranged inside or outside the UE, and these devices may include but not limited to a keypad, a display, a speaker, a microphone and a joystick. The processor 1300 may take charge of managing the bus architecture as well as general processing. The memory 1320 may store therein data for the operation of the processor 1300.

In a possible embodiment of the present disclosure, the SI table may include an SI table received by the UE and periodically broadcast by the network side device, or an SI table pre-configured or pre-stored in the UE, or an SI table acquired by the UE through downloading.

In a possible embodiment of the present disclosure, the SI table may include SI periodically broadcast by the network side device and/or on-demand SI.

In a possible embodiment of the present disclosure, the processor 1300 is further configured to: receive through the transceiver 1310 an SI table request transmitted by the UE via an SI table request resource, the SI table request resource being a resource acquired by the UE from the SI periodically broadcast by the network side device; and transmit through the transceiver 1310 the SI table to the UE based on the SI table request.

In a possible embodiment of the present disclosure, the SI table includes on-demand SI from the network side device.

In a possible embodiment of the present disclosure, the SI table may include a valid area. The valid area may include one or more SI areas having a same SI table, or the valid area may include one or more cells having a same SI table, or the valid area may include one or more network side devices having a same SI table.

In a possible embodiment of the present disclosure, there is an implicit mapping relationship between the SI table and the valid area, or the SI table may further include description information about the valid area of the SI table.

In a possible embodiment of the present disclosure, the description information may include one or more of a SI area identifier list, a cell identifier list and a network side device identifier list, or the description information may include an SI table identifier for identifying the valid area of the SI table.

In a possible embodiment of the present disclosure, the processor 1300 is further configured to periodically broadcast or transmit on demand the SI table index to the UE, or periodically broadcast or transmit on demand the SI table index and an SI table identifier to the UE.

In a possible embodiment of the present disclosure, the SI table index may be a one-level SI table index pointing to a group of SI and a parameter configuration of the group of SI, and the group of SI may include one or more pieces of SI, or the SI table index may be a two-level SI table index with a first-level index pointing to the SI and a second-level index pointing to a parameter configuration of the SI to which the first-level index points.

It should be appreciated that, the implementation of the network side device may refer to the implementation of the method at the network side device mentioned hereinabove, with a same beneficial effect, which will not be particularly defined herein.

It should be further appreciated that, the device and method may be implemented in any other ways. For example, the embodiments for the apparatus is merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. These units may be implemented in the form of hardware, or hardware plus software.

The functional units implemented in a software form may be stored in a computer-readable medium. These software functional units may be stored in a storage medium and include several instructions so as to enable a computer device (a personal computer, a server or network device) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for acquiring system information (SI), comprising:
    receiving, by a User Equipment (UE), an SI table index from a network side device;
    acquiring, by the UE, the SI based on the SI table index and a pre-acquired SI table,
    wherein the SI table comprises SI table indices, SI and a parameter configuration of the SI;
    wherein the SI table index is a one-level SI table index in a group of SI and a parameter configuration of the group of SI, and the group of SI comprises one or more SI, or the SI table index is a two-level SI table index with a first-level index pointing to the SI and a second-level index pointing to a parameter configuration of the SI to which the first-level index points.

2. The method according to claim 1, wherein the SI table comprises an SI table received by the UE and periodically broadcast by the network side device, or the SI table comprises an SI table pre-configured or pre-stored in the UE, or the SI table comprises an SI table acquired by the UE through downloading.

3. The method according to claim 2, wherein the SI table comprises SI periodically broadcast by the network side device and/or on-demand SI.

4. The method according to claim 1, further comprising: transmitting, by the UE, an SI table request to the network side device via an SI table request resource, the SI table request resource being a resource acquired by the UE from the SI periodically broadcast by the network side device; and
    receiving, by the UE, the SI table transmitted by the network side device based on the SI table request.

5. The method according to claim 4, wherein the SI table comprises on-demand SI from the network side device.

6. The method according to claim 1, wherein the SI table comprises a valid area, and the valid area comprises one or more SI areas having a same SI table, or the valid area comprises one or more cells having a same SI table, or the valid area comprises one or more network side devices having a same SI table.

7. The method according to claim 6, wherein there is an implicit mapping relationship between the SI table and the valid area, or the SI table further comprises description information about the valid area of the SI table,
    wherein the description information comprises one or more of a SI area identifier list, a cell identifier list and a network side device identifier list, or the description information comprises an SI table identifier for identifying the valid area of the SI table.

8. The method according to claim 1, wherein the receiving, by the UE, the SI table index from the network side device comprises receiving, by the UE, the SI table index periodically broadcast or transmitted on demand by the network side device, and
    the acquiring, by the UE, the SI based on the SI table index and the pre-acquired SI table comprises: determining, by the UE, whether the SI table comprises the received SI table index, if yes, determining that the SI table is valid, and otherwise determining that the SI table is invalid; and when the SI table is valid, looking up, by the UE, the SI corresponding to the received SI table index in the SI table.

9. The method according to claim 1, further comprising: detecting, by the UE, an identifier corresponding to the network side device, the identifier comprising a SI area identifier, a cell identifier or a network side device identifier; and determining, by the UE, whether the network side device is located in the valid area of the SI table based on the detected identifier, if yes, determining that the SI table is valid, and otherwise, determining that the SI table is invalid,
    wherein the receiving, by the UE, the SI table index from the network side device comprises, when the SI table is valid, receiving, by the UE, the SI table index periodically broadcast or transmitted on demand by the network side device, and
    the acquiring, by the UE, the SI based on the SI table index and the pre-acquired SI table comprises looking up, by the UE, the SI corresponding to the received SI table index in the SI table.

10. The method according to claim 1, wherein the receiving, by the UE, the SI table index from the network side device comprises receiving, by the UE, the SI table index and an SI table identifier periodically broadcast or transmitted on demand by the network side device, and
    the acquiring, by the UE, the SI based on the SI table index and the pre-acquired SI table comprises: determining, by the UE, whether the received SI table identifier is the same as an SI table identifier in the SI table, if yes, determining that the SI table is valid, and otherwise, determining that the SI table is invalid; and when the SI table is valid, looking up, by the UE, the SI corresponding to the received SI table index in the SI table.

11. The method according to claim 1, further comprising, when the UE determines that the SI table is invalid, acquiring, by the UE, a new SI table.

12. A method for acquiring SI, comprising transmitting, by a network side device, an SI table index to a UE, so as to enable the UE to acquire the SI based on the SI table index and a pre-acquired SI table, wherein the SI table comprises SI table indices, SI and a parameter configuration of the SI;
wherein the SI table index is a one-level SI table index in a group of SI and a parameter configuration of the group of SI, and the group of SI comprises one or more SI, or the SI table index is a two-level SI table index with a first-level index pointing to the SI and a second-level index pointing to a parameter configuration of the SI to which the first-level index points.

13. The method according to claim 12, wherein the SI table comprises an SI table received by the UE and periodically broadcast by the network side device, or an SI table pre-configured or pre-stored in the UE, or an SI table acquired by the UE through downloading,
wherein the SI table comprises SI periodically broadcast by the network side device and/or on-demand SI.

14. The method according to claim 12, further comprising:
receiving, by the network side device, an SI table request transmitted by the UE via an SI table request resource, the SI table request resource being a resource acquired by the UE from the SI periodically broadcast by the network side device; and
transmitting, by the network side device, the SI table to the UE based on the SI table request,
wherein the SI table comprises on-demand SI from the network side device.

15. The method according to claim 14, wherein there is an implicit mapping relationship between the SI table and the valid area, or the SI table further comprises description information about the valid area of the SI table, wherein the description information comprises one or more of a SI area identifier list, a cell identifier list and a network side device identifier list, or the description information comprises an SI table identifier for identifying the valid area of the SI table.

16. The method according to claim 12, wherein the SI table comprises a valid area, and the valid area comprises one or more SI areas having a same SI table, or the valid area comprises one or more cells having a same SI table, or the valid area comprises one or more network side devices having a same SI table.

17. The method according to claim 12, wherein the transmitting, by the network side device, the SI table index to the UE comprises periodically broadcasting or transmitting on demand, by the network side device, the SI table index to the UE, or periodically broadcasting or transmitting on demand, by the network side device, the SI table index and an SI table identifier to the UE.

18. A user equipment (UE), comprising a processor, a transceiver and a memory, wherein
the processor is configured to read a program stored in the memory, so as to: receive through the transceiver a system information (SI) table index from a network side device; and acquire the SI based on the SI table index and a pre-acquired SI table,
the SI table comprises SI table indices, SI and a parameter configuration of the SI, and
the transceiver is configured to receive and transmit data under the control of the processor;
wherein the SI table index is a one-level SI table index in a group of SI and a parameter configuration of the group of SI, and the group of SI comprises one or more SI, or the SI table index is a two-level SI table index with a first-level index pointing to the SI and a second-level index pointing to a parameter configuration of the SI to which the first-level index points.

\* \* \* \* \*